(12) United States Patent
Mathew et al.

(10) Patent No.: US 7,860,240 B2
(45) Date of Patent: Dec. 28, 2010

(54) NATIVE COMPOSITE-FIELD AES ENCRYPTION/DECRYPTION ACCELERATOR CIRCUIT

(75) Inventors: Sanu Mathew, Hillsboro, OR (US); Farhana Sheikh, Berkley, CA (US); Ram Krishnamurthy, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 788 days.

(21) Appl. No.: 11/771,723

(22) Filed: Jun. 29, 2007

(65) Prior Publication Data

US 2009/0003589 A1    Jan. 1, 2009

(51) Int. Cl.
*H04K 1/10* (2006.01)
(52) U.S. Cl. .......................................... 380/28; 380/29
(58) Field of Classification Search ............. 380/28–29, 380/37; 713/189
See application file for complete search history.

(56) References Cited

U.S. PATENT DOCUMENTS

2008/0253557 A1 * 10/2008 Dottax et al. ................. 380/28

OTHER PUBLICATIONS

S. Pongyupinpanich, S. Phathumvanh and S. Choomchuay, "A 32 Bits Architecture For An AES System", International Symposium on communications and Information Technologies, 2004 (ISCIT 2004) Sapporo, Japan, Oct. 26-29, 2004, pp. 70-73.

S. Chantarawong, P. Noo-intara, and S. Choomchuay, "An Architecture for S-Box Computation in the AES", Proc of Information and Computer Engineering Workshop 2004 (ICEP2004), Prince of Songkla University (Phuket Campus), Jan. 2004, pp. 157-162.

* cited by examiner

*Primary Examiner*—Hosuk Song
(74) *Attorney, Agent, or Firm*—Blakely, Sokoloff, Taylor & Zafman LLP

(57) ABSTRACT

A system comprises reception of input data of a Galois field $GF(2^k)$, mapping of the input data to a composite Galois field $GF(2^{nm})$, where k=nm, inputting of the mapped input data to an Advanced Encryption Standard round function, performance of two or more iterations of the Advanced Encryption Standard round function in the composite Galois field $GF(2^{nm})$, reception of output data of a last of the two or more iterations of the Advanced Encryption Standard round function, and mapping of the output data to the Galois field $GF(2^k)$.

12 Claims, 10 Drawing Sheets

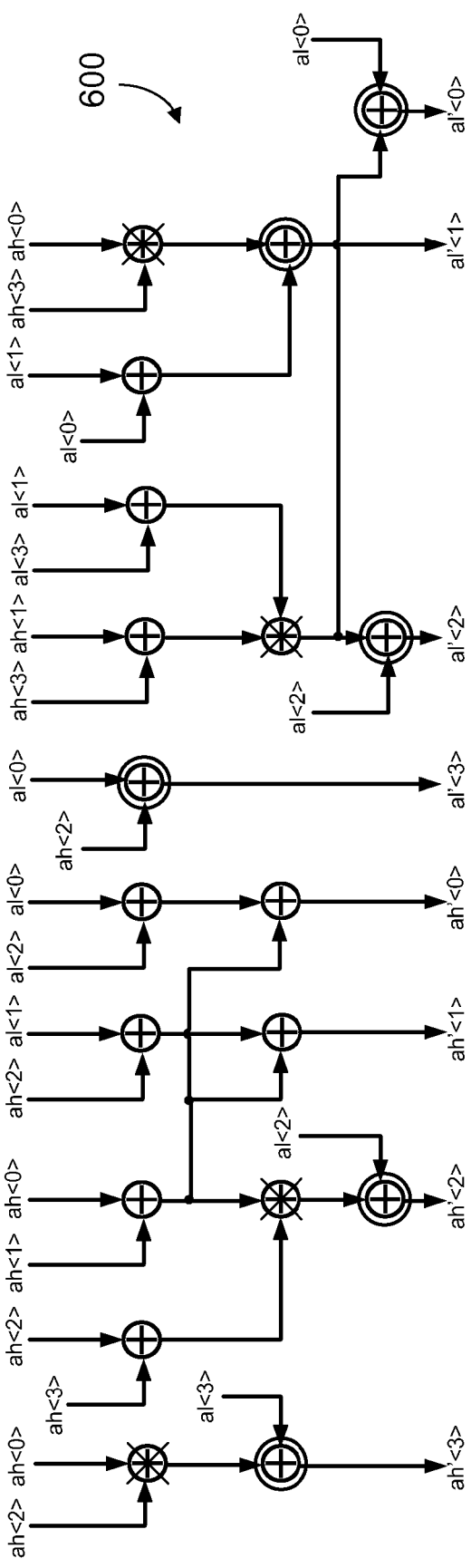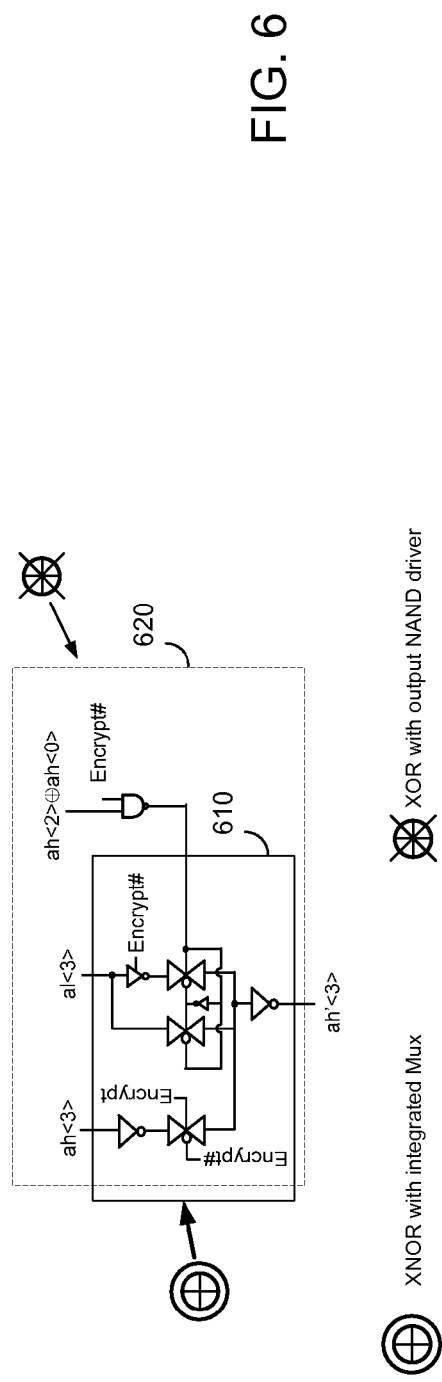
FIG. 6

← 900

Ground Field Polynomial: $x^4 + x + 1$
Composite Field Polynomial: $x^2 + x + 0xB$ MixColumns in $GF(2^4)^2$ $$\begin{bmatrix} S'(0,c) \\ S'(1,c) \\ S'(2,c) \\ S'(3,c) \end{bmatrix} = \begin{bmatrix} 2b & 2a & 01 & 01 \\ 01 & 2b & 2a & 01 \\ 01 & 01 & 2b & 2a \\ 2a & 01 & 01 & 2b \end{bmatrix} \begin{bmatrix} S(0,c) \\ S(1,c) \\ S(2,c) \\ S(3,c) \end{bmatrix}$$

S'(0,c) = {2b}*S(0,c)+{2a}*S(1,c)+{01}*S'(2,c) {01}*S(3,c)

Inverse MixColumns in $GF(2^4)^2$ $$\begin{bmatrix} S'(0,c) \\ S'(1,c) \\ S'(2,c) \\ S'(3,c) \end{bmatrix} = \begin{bmatrix} 21 & 63 & 0b & 48 \\ 48 & 21 & 63 & 0b \\ 0b & 48 & 21 & 63 \\ 63 & 0b & 48 & 21 \end{bmatrix} \begin{bmatrix} S(0,c) \\ S(1,c) \\ S(2,c) \\ S(3,c) \end{bmatrix}$$

NATIVE COMPOSITE-FIELD AES ENCRYPTION/DECRYPTION ACCELERATOR CIRCUIT

BACKGROUND

Advanced Encryption Standard (AES) is a symmetric-key encryption protocol that some computing platforms use to encrypt and decrypt all read/write hard drive accesses. In order to prevent such reads/writes from swamping processor performance, hardware acceleration of AES encrypt/decrypt operations is desirable.

AES provides several modes of operation. AES-128, AES-192 and AES-256 modes of operation submit 128-bit input data to, respectively, 10, 12 and 14 iterations of an AES round operation. The AES round operation includes successive SubstituteByte, ShiftRow and MixColumns transformations, followed by an AddRoundKey operation.

During the SubstituteByte transformation, each 8-bits of the 128-bit input data is input to one of sixteen S-boxes. Each S-box computes the multiplicative inverse of its respective 8-bit input in the Galois Field $GF(2^8)$. Some implementations map the 8-bit input to a composite field $GF(2^4)^2$, compute the multiplicative inverse in $GF(2^4)^2$, map the result back to $GF(2^8)$, and proceed to the ShiftRow transformation. These existing implementations are unsuitable in terms of silicon footprint, power and/or cycle time.

BRIEF DESCRIPTION OF THE DRAWINGS

FIG. 6 is a diagram of an affine transform circuit according to some embodiments.

FIG. 9 is a diagram illustrating matrices of a MixColumn transformation and an InverseMixColumn transformation according to some embodiments.

DETAILED DESCRIPTION

Figure 1:
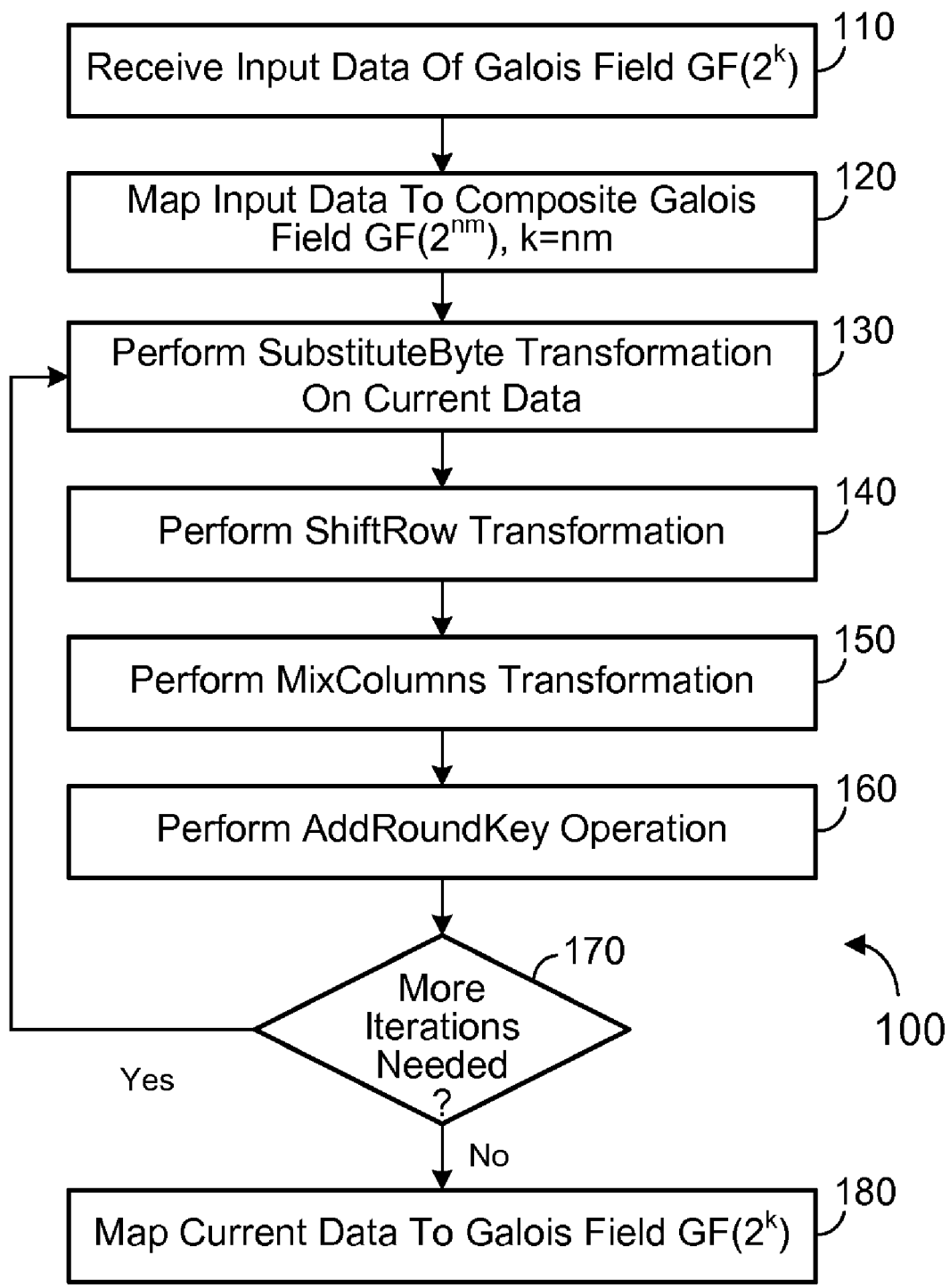
FIG. 1 is a flow diagram of a process according to some embodiments.

FIG. 1 is a flow diagram of process 100 according to some embodiments. Process 100 may be executed by dedicated hardware such as an encryption accelerator embodied as a functional block of a microprocessor, or in a dedicated integrated circuit. Process 100 and any of the processes described herein may be performed by hardware, software (including microcode), or a combination of hardware and software.

Input data of Galois Field $GF(2^k)$ is initially received at 110. The input data may comprise 128-bit data of Galois Field $GF(2^8)$ according to some embodiments. Next, at 120, the input data is mapped to composite Galois Field $GF(2^{nm})$, where $nm=k$. In some embodiments, $n=4$ and $m=2$.

A SubstituteByte transformation is performed on the data at 130. Generally, the SubstituteByte transformation comprises a non-linear byte substitution in Galois Field $GF(2^4)^2$. The transformation includes two sub-transformations: multiplicative inverse and affine transformation. The SubstituteByte transformation, as well as the other transformations and operation of process 100, may conform to the NIST Advanced Encryption Standard (FIP PUB 197, Nov. 26, 2001). Embodiments are not limited thereto.

Figure 2:
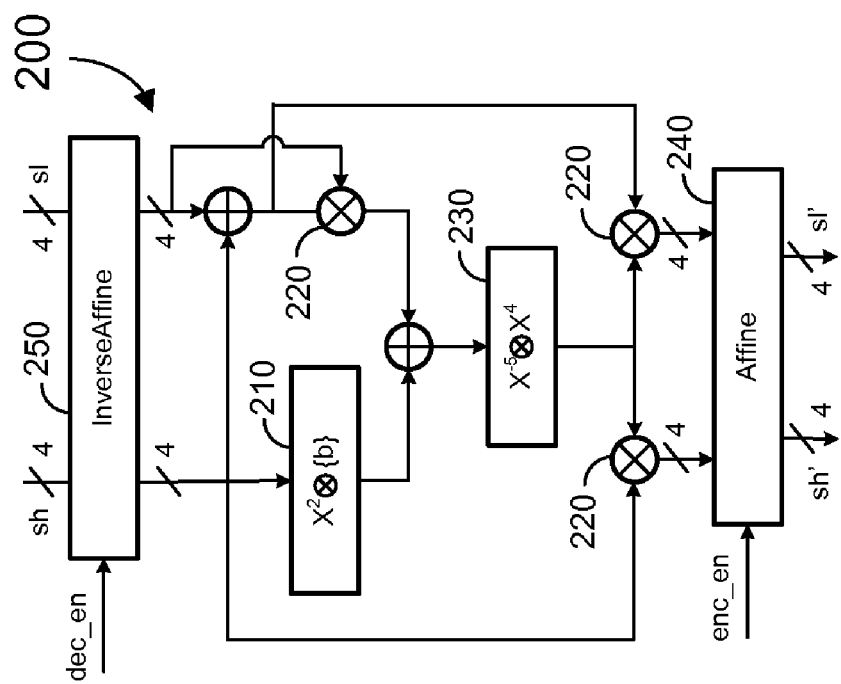
FIG. 2 is a diagram of an S-block according to some embodiments.

The input data may be broken into 16 8-bit fields, each of which is input to a respective S-box to perform the two sub-transformations of the SubstituteByte transformation. FIG. 2 illustrates S-box 200 to receive an 8-bit field according to some embodiments. S-box 200 includes square-multiply circuit 210, Galois Field $(2^n)$ multipliers 220, inverse circuit 230, affine transformation block 240 and inverse affine transformation block 250.

Figure 3:
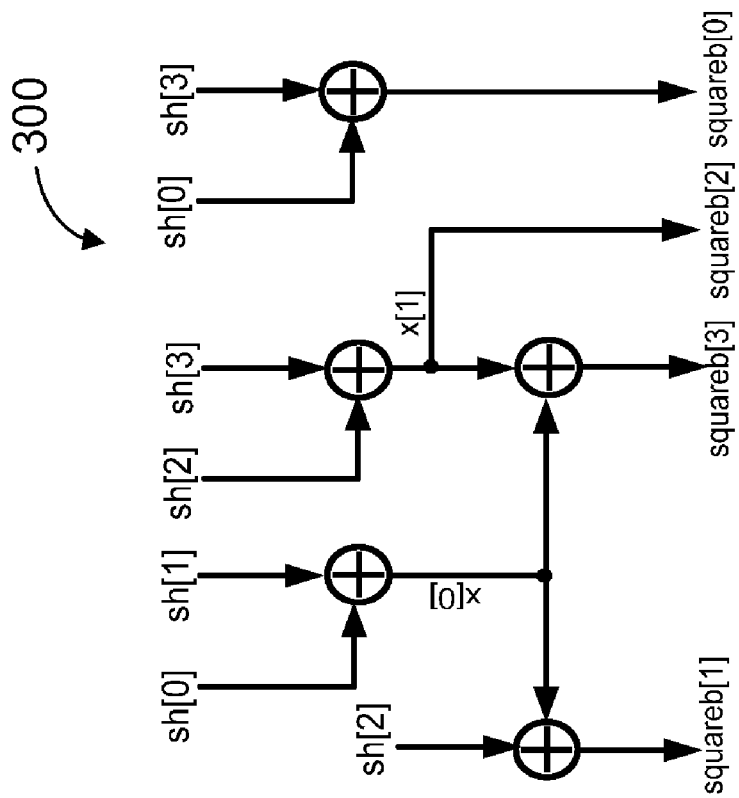
FIG. 3 is a diagram of a square-multiply circuit according to some embodiments.
Figure 4:
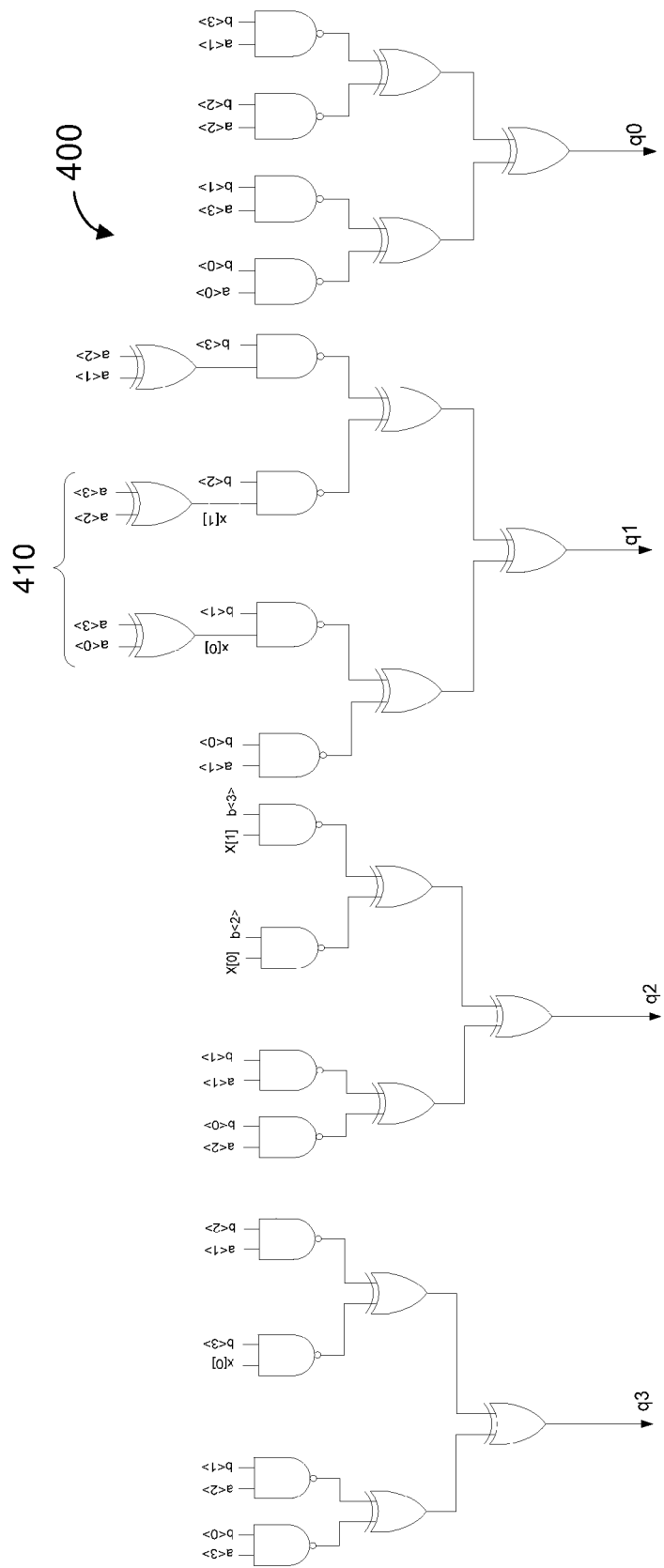
FIG. 4 is a diagram of a $GF(2^4)$ multiplier circuit according to some embodiments.

Square-multiply circuit 300 of FIG. 3 may comprise an implementation of circuit 210. Similarly, multiplier 400 of FIG. 4 may implement any one or more of multipliers 220 of S-box 200. Multiplier 400 takes advantage of the respective arrival times of its inputs to reduce its delay from 3XORs+1NAND gate to 2XORs+1NAND gate, by tying early arriving inputs to inputs 410.

Figure 5:
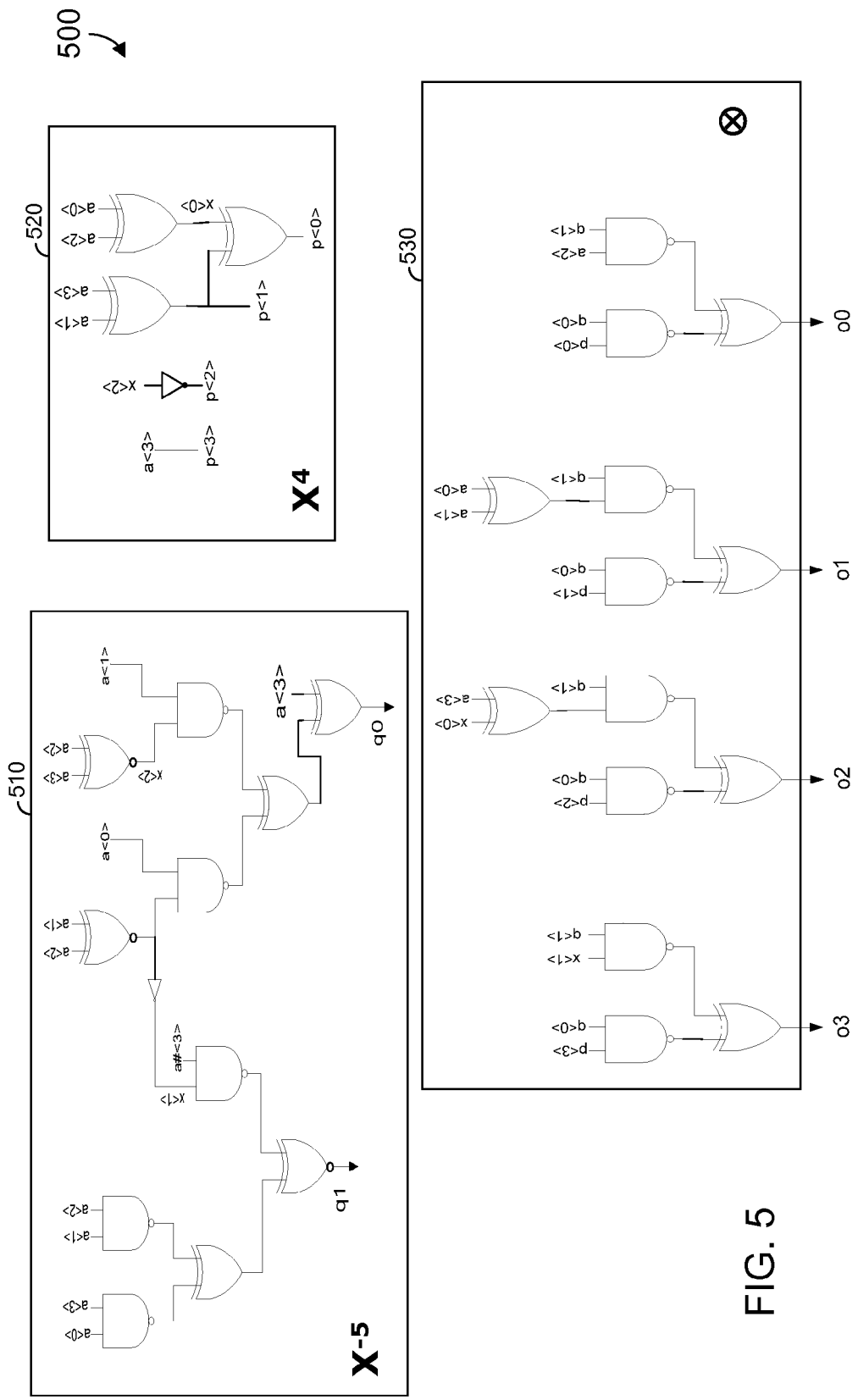
FIG. 5 is a diagram of a circuit to determine a multiplicative inverse according to some embodiments.
Figure 7:
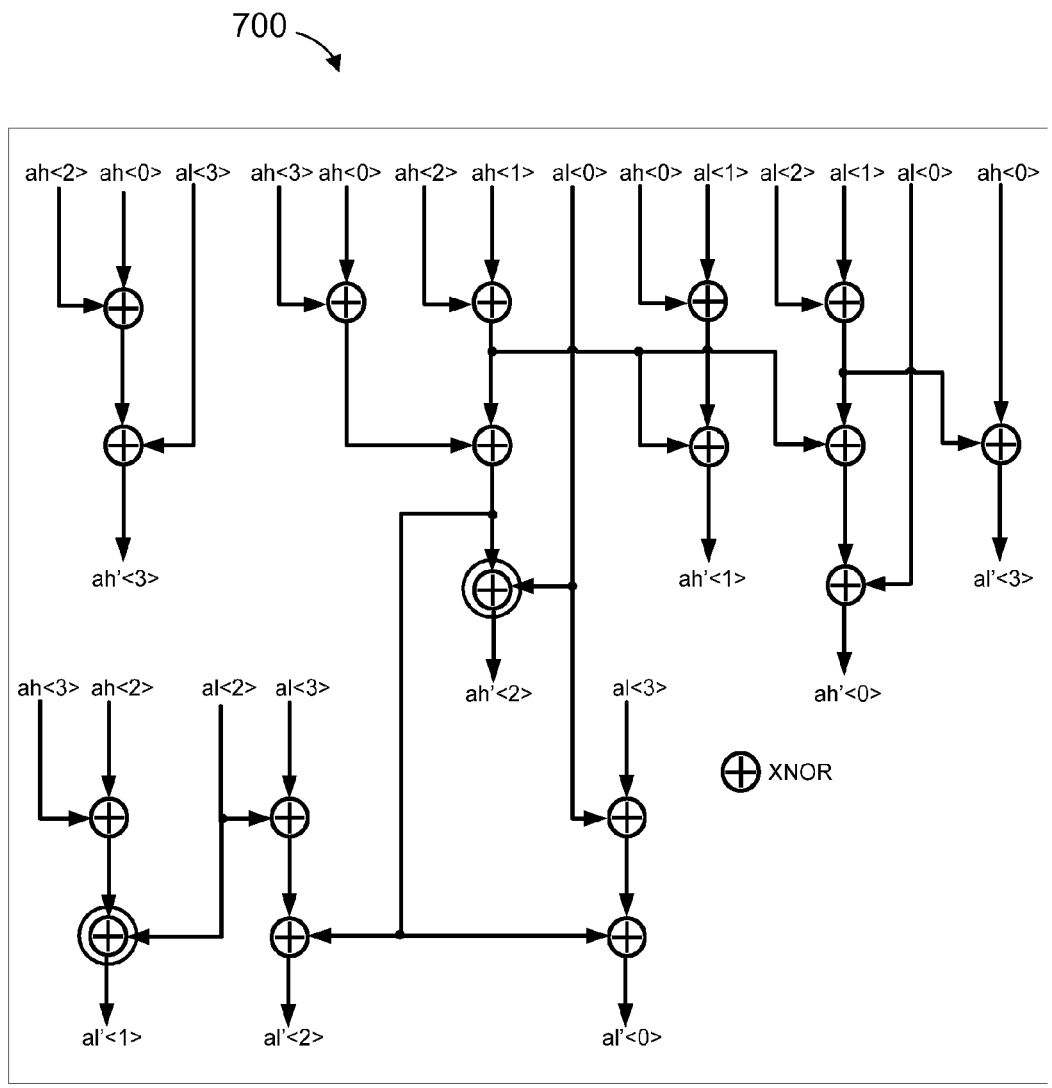
FIG. 7 is a diagram of an inverse-affine transform circuit according to some embodiments.

An example of inverse circuit 230 is illustrated by circuit 500 of FIG. 5. Notably, circuit 500 comprises calculation of $X^{-5}$ (circuit 510) and $X^4$ (circuit 520) in Galois Field $GF(2^4)^2$, wherein X=the 8-bit input data. Circuit 500 also includes a multiplier 530 to determine the multiplicative inverse $X^{-1}$ by multiplying $X^{-5}$ and $X^4$ in Galois Field $GF(2^4)^2$.

Native $GF(2^4)^2$ S-boxes require custom affine and inverse-affine matrices, with multiplicative factors and constants which are also mapped from $GF(2^8)$ to $GF(2^4)^2$. Moreover, affine transformation block 240 is active during the encrypt operation only and should be bypassed during the decrypt operation. Conversely, inverse affine transformation block 250 is active during the decrypt operation only and should be bypassed during the encrypt operation.

S-box 200 advantageously includes a common datapath for affine transformation block 240 and inverse-affine transformation block 250. Affine transformation block 600 of FIG. 6 may provide features to implement such a common datapath. Block 600 is bypassed during decrypt by the use of integrated Mux-XOR circuits 610. XOR gates 620 that feed into Mux-XOR circuits 610 are specialized XOR gates in which the output inverter is converted to a NAND gate. During decrypt (i.e., Encrypt=0, Encrypt#=1), the outputs of XOR gates 620 are forced to '1', and the bypass paths of Mux-XOR circuits 610 are activated. Inverse-affine transformation block 700 also uses Mux-XOR circuits 610 at the output to bypass block 700 during encrypt.

Returning to process 100, a ShiftRow transformation is performed at 140 in Galois Field $GF(2^{nm})$. The shift row transformation may comprise a linear diffusion process operating on an individual row. As a result, each row of an input array is rotated by a certain number of byte positions.

Figure 8:
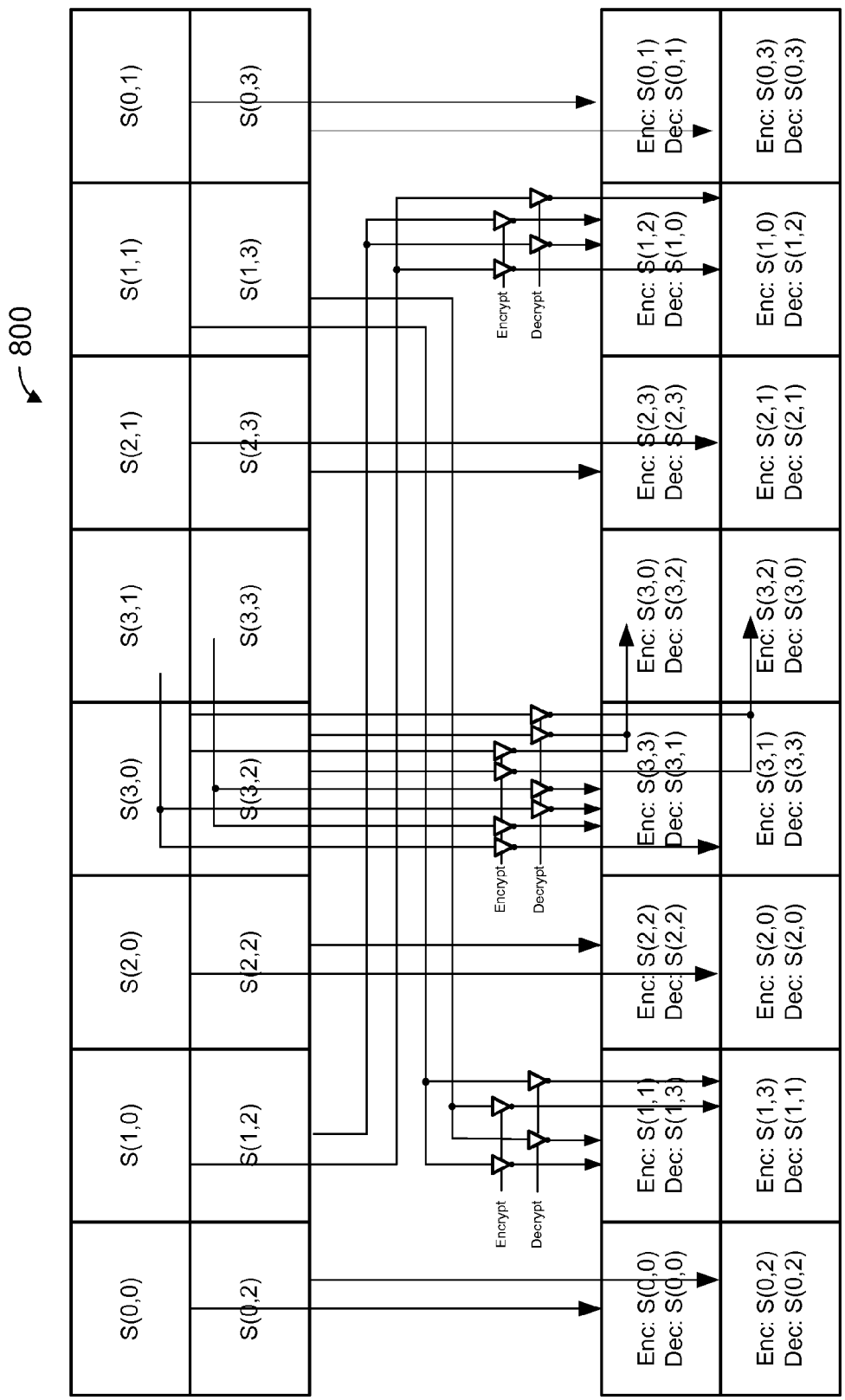
FIG. 8 is a diagram of a ShiftRow/InverseShiftRow block according to some embodiments.

FIG. 8 illustrates ShiftRow/InverseShiftRow block 800 according to some embodiments. Block 800 uses a folded datapath organization to reduce a total number of wires by 50% over conventional implementations. The ShiftRow transformation (i.e., during encrypt mode) and the Inverse-ShiftRow transformation (i.e., during decrypt mode) share the same wires, with tristate buffers enabled in either mode to tap off a signal at an appropriate column to perform the required permutation.

Next, at 150, a MixColumns transformation in Galois Field $GF(2^{nm})$ is performed on the output of the ShiftRow transformation of 140. The MixColumns transformation is also a linear diffusion process. A column vector is multiplied in Galois Field $GF(2^{nm})$ using a fixed matrix in which bytes are treated as polynomials of degree less than four.

The matrix of the MixColumns transformation and the matrix of the InverseMixColumns transformation are transformed from conventional implementations to operate in Galois Field GF($2^{nm}$). Moreover, some embodiments implement the two matrices using a common datapath. The composite field polynomial $x^2+x+B$ may be chosen to maximize the overlap between the two matrices, although other polynomials may be chosen in accordance with some embodiments. FIG. 9 illustrates the matrix of the MixColumns transformation and the matrix of the InverseMixColumns transformation in Galois Field GF($2^{nm}$) according to some embodiments.

Figure 10:
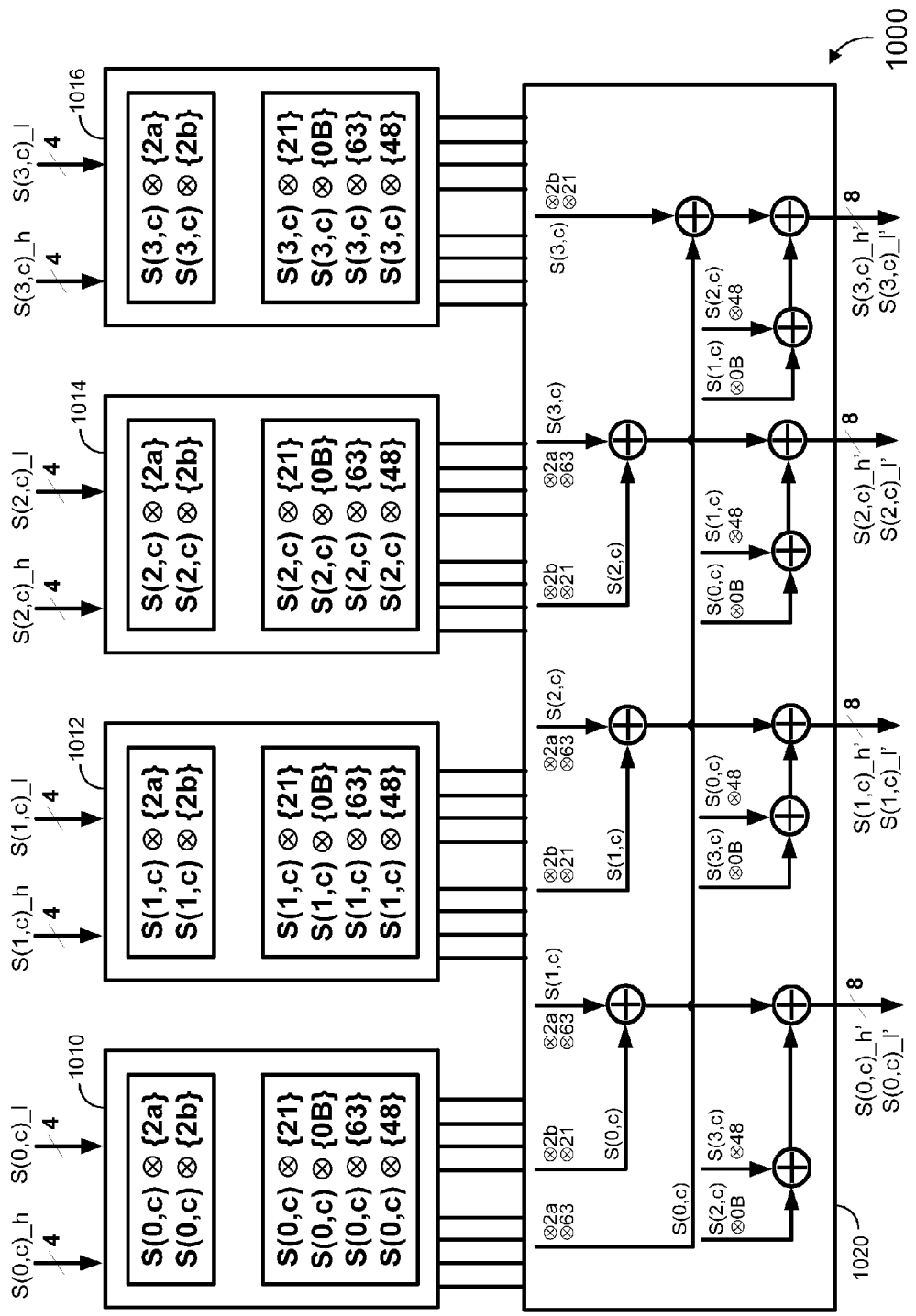
FIG. 10 is a diagram of a MixColumn/InverseMixColumn block according to some embodiments.
Figure 11:
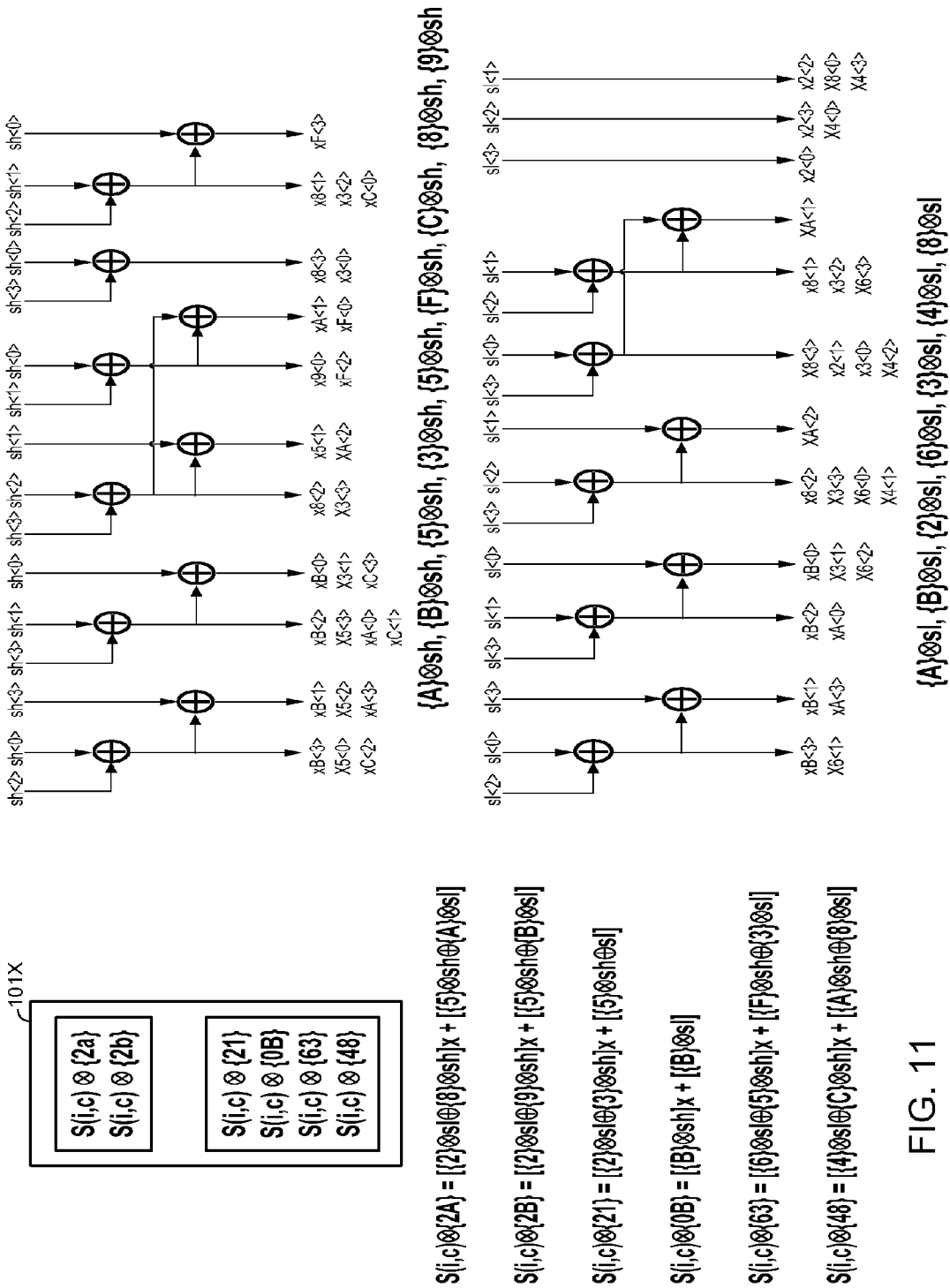
FIG. 11 is a diagram of an 8-bit slice of a MixColumn block according to some embodiments.

FIG. 10 illustrates MixColumn/InverseMixColumn block 1000 according to some embodiments. Block 1000 operates on 32-bits of data and includes four 8-bit blocks 1010-1016 to generate each scaled term and XOR-tree 1020 to add up the relevant terms. FIG. 111 depicts 8-bit block 101X according to some embodiments. The composite field polynomial has been selected to minimize the size of 8-bit block 101X.

The AddRoundKey operation is performed on the current data at 160. The AddRoundKey operation is also performed in Galois Field GF($2^{nm}$). Specifically, each byte of the current array may be added (in GF($2^{nm}$)) to a byte of a corresponding array of the round subkeys. The subkeys are derived from original keys by XORing two previous columns. Next, at 170, it is determined whether additional iterations are needed.

As mentioned above, AES-128, AES-192 and AES-256 modes of operation require 10, 12 and 14 iterations of the AES round operation, respectively. Embodiments are not limited to these modes or these numbers of iterations. Regardless, if additional iterations are needed, flow returns to 130 where the current data (i.e., the data output by the prior AddRoundKey operation) is subjected to the SubstituteByte transformation.

Flow therefore cycles between 130 and 170 until it is determined that additional iterations are not needed. Than, at 180, the current data (i.e., the data output by the prior AddRoundKey operation) is mapped from the composite Galois Field GF($2^{nm}$) to Galois Field GF($2^k$). Some embodiments may therefore provide AES encryption/decryption of a Galois Field GF($2^k$) input using less silicon footprint, power and/or cycle time than prior implementations.

The several embodiments described herein are solely for the purpose of illustration. Therefore, persons in the art will recognize from this description that other embodiments may be practiced with various modifications and alterations.

What is claimed is:

1. A method comprising:
    receiving, by an integrated circuit, input data of a Galois field GF(2.sup.k);
    mapping the input data to a composite Galois field GF(2.sup.nm), wherein k=nm;
    inputting the mapped input data to an Advanced Encryption Standard round function, wherein the Advanced Encryption Standard round function comprises bypassing an affine transformation block of a datapath when the input data is to be decrypted;
    performing, by the integrated circuit, two or more iterations of the Advanced Encryption Standard round function in the composite Galois field GF(2.sup.nm);
    receiving output data of a last of the two or more iterations of the Advanced Encryption Standard round function; and
    mapping the output data to the Galois field GF(2.sup.k).

2. The method of claim 1, wherein the Advanced Encryption Standard round function comprises:
    performing a SubstituteByte transformation in the composite Galois field GF(2.sup.nm);
    performing a ShiftRow transformation in the composite Galois field GF(2.sup.nm);
    performing a MixColumns transformation in the composite Galois field GF(2.sup.nm); and
    performing an AddRoundKey operation in the composite Galois field GF(2.sup.nm).

3. The method of claim 1, wherein the Advanced Encryption Standard round function comprises:
    computing X.sup.−5*X.sup.4 in the composite Galois field GF(2.sup.nm), wherein X is the input data.

4. The method of claim 1, wherein the Advanced Encryption Standard round function comprises:
    bypassing an inverse-affine transformation block of the datapath when the input data is to be encrypted.

5. The method of claim 1, wherein bypassing the affine transformation block comprises:
    activating a bypass path of an integrated mux-XOR circuit.

6. A circuit comprising:
    a first circuit to receive input data of a Galois field GF(2.sup.k) and to map the input data to a composite Galois field GF(2.sup.nm), wherein k=nm;
    an encrypt-decrypt circuit to receive the mapped input data and to perform two or more iterations of an Advanced Encryption Standard round function in the composite Galois field GF(2.sup.nm), wherein the encrypt-decrypt circuit includes a datapath comprising an affine transformation block which is bypassed when the input data is to be decrypted; and
    a second circuit to receive output data of a last of the two or more iterations of the Advanced Encryption Standard round function, and to map the output data to the Galois field GF(2.sup.k).

7. The circuit of claim 6, wherein the encrypt-decrypt circuit comprises:
    a SubstituteByte circuit to perform a SubstituteByte transformation in the composite Galois field GF(2.sup.nm);
    a ShiftRow circuit to perform a ShiftRow transformation in the composite Galois field GF(2.sup.nm);
    a MixColumns circuit to perform a MixColumns transformation in the composite Galois field GF(2.sup.nm); and
    an AddRoundKey circuit to perform an AddRoundKey operation in the composite Galois field GF(2.sup.nm).

8. The circuit of claim 6, wherein the SubstituteByte circuit comprises:
    a circuit to compute X.sup.−5*X.sup.4 in the composite Galois field GF(2.sup.nm), wherein X is the input data.

9. The circuit of claim 6, wherein the datapath of the encrypt-decrypt circuit further comprises:
    an inverse-affine transformation block,
    which is bypassed when the input data is to be encrypted.

10. The circuit of claim 6, wherein the affine transformation block comprises:
    an integrated mux-XOR circuit to bypass the affine transformation block.

11. The circuit of claim 7, wherein the ShiftRow circuit comprises:
    a datapath comprising a ShiftRow block and an Inverse-ShiftRow block.

12. The circuit of claim 7, wherein the MixColumns circuit comprises:
    a datapath comprising a MixColumns block and an InverseMixColumns block.

* * * * *